May 13, 1941.  H. C. GOLZ  2,241,456
SCREW SLOTTING APPARATUS
Filed Jan. 11, 1940
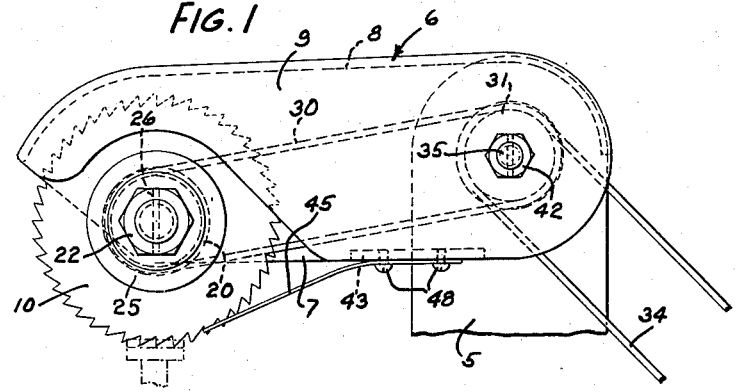
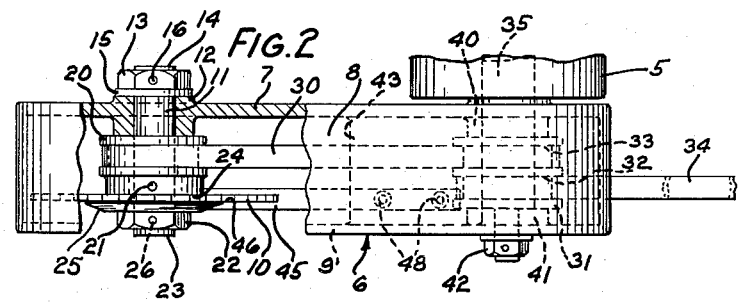
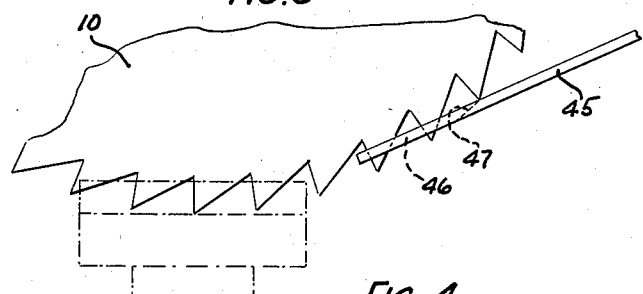
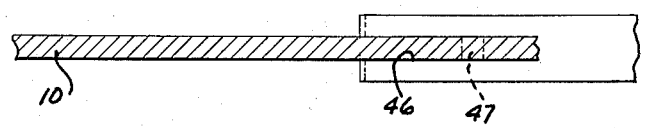
INVENTOR
H. C. GOLZ
BY Emery Robinson
ATTORNEY Patented May 13, 1941

2,241,456

UNITED STATES PATENT OFFICE 2,241,456

SCREW SLOTTING APPARATUS

Harold C. Golz, Chicago, Ill., assignor to Western Electric Company, Incorporated, New York, N. Y., a corporation of New York Application January 11, 1940, Serial No. 313,328

2 Claims. (Cl. 90—11)

This invention relates to screw slotting apparatus and more particularly to a saw cleaning attachment for screw slotting saws.

Quite frequently, in the manufacture of screws, the heads of the screws are damaged during their slotting by chips cut from previously slotted screws accumulating in the teeth of the slotting saw.

It is an object of the present invention to provide a means for preventing the accumulation of chips or burrs in saws.

In accordance with one embodiment of the invention, a screw slotting saw mounted in a rocker head of a slotting machine is provided with chip removing spring mounted on the rocker head and engaging the saw during the slotting of screw heads to remove chips from the teeth of the saw and prevent them from accumulating on the teeth to such an extent as to damage the head of the screw.

A better understanding of the invention may be had by reference to the following description of one embodiment thereof, when considered in connection with the accompanying drawing, wherein Fig. 1 is a side elevational view of the rocker head and the saw supported by it in a screw head slotting machine;

Fig. 2 is a plan view of the apparatus shown in Fig. 1, parts being broken away to more clearly illustrate certain details thereof;

Fig. 3 is a side elevational view on an enlarged scale of certain details of the apparatus shown in Fig. 1; and Fig. 4 is a vertical sectional view of the apparatus shown in Fig. 3 showing the relation of the saw and chip removing spring.

Referring to the drawing, wherein like reference characters designate similar parts throughout the several views, the numeral 5 designates a support post on which a rocker head 6 of a screw slotting machine is pivoted. The rocker head 6 is hollow and comprises a back wall 7, a curved top wall 8 and a front wall 9, which enclose a circular saw 10 and cooperating parts adapted to cut a slot in the head of a screw 18, shown in dot and dash lines. A shaft 11 is journalled in a boss 12 formed on the back wall 7 and is fixed in place by a nut 13 threaded on a reduced end 14 thereof, a washer 15 being interposed between the nut 13 and the rear surface of the boss 12 and the nut being prevented from rotation with respect to the shaft 11 by a pin 16 passed through the nut 13 and shaft 11.

The forward end (lower in Fig. 2) of the shaft 11 has a pulley 20 fixed to it by means of a pin 21. The saw 10 is mounted on the shaft 11 and secured thereto by a nut 22 threaded onto a reduced end 23 of the shaft and clamping the saw 10 against a shoulder 24, a washer 25 being interposed between the nut 22 and the saw 10 and a pin 26 being passed through the nut 22 and reduced portion 23 of the shaft 11. The pulley 20 is thus fixed to the saw 10 and drives the saw when a belt 30, which engages the pulley 20, is driven by a driving pulley 31. The pulley 31 has a pair of belt receiving grooves 32 and 33, the groove 33 being adapted to receive the belt 30 and the groove 32 being adapted to receive a belt 34 driven from a power source (not shown). The pulley 31 is freely rotatable about a supporting shaft 35 mounted in the support post 5, which shaft 35 also supports the rocker head 6 for oscillation about it. Formed on the rocker head 6 are a pair of bosses 40 and 41, which serve as bearings for the head 6 in its oscillation about the shaft 35, which has a nut 42 on its extending end to hold the rocker head 6 on the shaft.

The underside of the rocker head 6 is provided with a plate 43, which serves as a brace between the front wall 9 and back wall 7 of the rocker head and supports a relatively thin leaf spring 45, which is secured to the plate 43 by screws 48—48 and resiliently engages the toothed edge of the saw 10. When the spring 45 is initially attached to the plate 43, the spring engages only the tips of the teeth in the saw 10. However, after the apparatus has been equipped with the spring 45 for some time, a slot 46 will be cut in the spring 45 by the saw 10 and then the edge 47 of the slot will engage the tips of the teeth and the sides of the slot will engage the sides of the saw 10 to remove any chips or burrs which may have caught on the teeth of the saw 10.

While the invention has been described as applied to a specific type of screw slotting apparatus, it is subject to many modifications and is to be limited only by the scope of the appended claims.

What is claimed is:

1. In a screw slotting apparatus, a circular saw, a support for said saw, and a leaf spring fixed to the support in a position at a tangent to the periphery of the saw and bearing against the teeth of the saw in the general area where the teeth of the saw are pointed downwardly, said spring being so positioned as to be cut by the saw and the slot formed in the spring having its edges adjacent the sides of the saw.

2. In a screw slotting apparatus, a circular saw, a support for said saw, and a leaf spring fixed to the support in a position at a tangent to the periphery of the saw and bearing against the teeth of the saw, at a point on the periphery of the saw adjacent and ahead of the point where the saw engages the screw head.

HAROLD C. GOLZ.